United States Patent [19]

Righetti

[11] Patent Number: 5,288,227
[45] Date of Patent: Feb. 22, 1994

[54] METHOD FOR COOLING CERAMICS, ESPECIALLY CERAMIC TILES PRODUCED IN ROLLER KILNS, AND THE RELATIVE PLANT

[76] Inventor: Renzo Righetti, Via Frescobaldi 17, 41049 Sassuolo, Italy

[21] Appl. No.: 613,673
[22] PCT Filed: Jul. 17, 1989
[86] PCT No.: PCT/IT89/00051
 § 371 Date: Jan. 17, 1991
 § 102(e) Date: Jan. 17, 1991
[87] PCT Pub. No.: WO90/01136
 PCT Pub. Date: Feb. 8, 1990

[30] Foreign Application Priority Data
 Jul. 19, 1988 [IT] Italy .................. 40118 A/88

[51] Int. Cl.$^5$ .................. F27D 15/02; F25D 17/02
[52] U.S. Cl. .................. 432/85; 110/171; 432/246
[58] Field of Search .................. 432/85, 246; 110/171

[56] References Cited

U.S. PATENT DOCUMENTS

| | | | |
|---|---|---|---|
| 1,979,697 | 11/1934 | Maring | 432/85 |
| 2,713,480 | 7/1955 | Ruckstahl | 432/85 |
| 4,343,607 | 8/1982 | Coleman | 432/85 |
| 4,431,406 | 2/1984 | Weiss | 432/85 |
| 4,444,556 | 4/1984 | Andersson | 432/85 |
| 4,960,056 | 10/1990 | Pillsbury | 110/171 |

*Primary Examiner*—Henry C. Yuen
*Attorney, Agent, or Firm*—Lowe, Price, LeBlanc & Becker

[57] ABSTRACT

The method involves passing the ceramics through water, by means of immersion and/or in jets, and/or sprayed, and/or nebulized, and/or in the form of steam. The plant includes a cooling booth (CR) which may be divided into one or more stations: with spray nozzles (2), with packs of revolving disks (5), with immersion (B) and with steam injectors (4). Cooling may take place in a closed cycle.

3 Claims, 7 Drawing Sheets

METHOD FOR COOLING CERAMICS, ESPECIALLY CERAMIC TILES PRODUCED IN ROLLER KILNS, AND THE RELATIVE PLANT

TECHNICAL FIELD OF THE INVENTION

The invention concerns a method for cooling ceramics, especially ceramic tiles produced in roller kilns, and the relative plant, or rather a completely new procedure for cooling glazed or unglazed ceramics, such as ceramic tiles in the initial heat treatment following the dryer and in kilns; the cooling system is also to be covered by a patent application.

BACKGROUND OF THE PRIOR ART

Current technology involves the cooling of ceramics using air conveyed by electric blowers into the cooling sections, which especially in kilns require expensive structures, stretching for many meters: this involves high plant construction and operating costs, in addition to the extensive space requirements and high capital investment, without considering the emission into the atmosphere of hot air at about 150° C. from the kiln.

There is considerable scope for improvement of this state of the art in relation to the possibility of eliminating the problems mentioned without damaging the product or impairing its quality.

From the above consideration there derives the need to solve the technical problem of identifying a new method providing a largescale reduction in the construction and operating costs of the cooling plant for ceramic products leaving the high-temperature pretreatment chamber and/or leaving the firing chamber, or in any heated state after which cooling is required: i.e. for any type of ceramic plant to which the new method is applicable.

This method must be suitable for application both to new kilns and to those already in operation, with structural modifications in the case of the latter.

The present invention solves the above technical problem by adopting a method involving passing the hot ceramic articles through water, by immersion, and/or in jets, and/or sprayed, and/or nebulized and/or in the form of steam: the latter case is especially suitable for the areas with highest temperature, obtaining all or part of the steam required from the steam generated by water-cooling in lower-temperature zones. When very hard water is used, and in all cases concerning glazes on which calcium salts deposited by the cooling water would be noticeable, the method envisages cooling from beneath only, i.e. on the rear of the tile, without the projection of any water which might reach the upper surface which has been glazed or is destined for decoration in any way.

The plant implementing the method includes at least one booth, preferably subdivided into one or more cooling stations: with upper and lower spray nozzles spraying out water, with upper and lower packs of disks revolving at high speed and projecting water by centrifugal force, by immersion, providing steam, or mixed. The steam generated by the water cooling process is removed by fans, while excess water is recycled.

In all cases the heat may be recycled using heat exchangers. When cooling is on the underside of the tile only, in order to prevent the deposit of calcium salts on the face intended to remain in view, the system incorporates idle or power-driven sponge transversal rollers provided with water from the inside or picking up water from below, which wet the tiles from underneath the conveyor belt line.

In the case of cooling from temperatures significantly above 150° C., since the tiles are to be conveyed on rollers, said rollers will be hollow and given radial holes to sprinkle the underside of the row of tiles with water supplied to the rollers themselves under a slight pressure.

In an exemplary application of the method constructed for a roller kiln already installed for production of 10,000 $m^2$/day of glazed and unglazed tiles, with a weight of approximately 13 kg/$m^2$, with feed speed approximately 5 m/min., the system comprises a booth with water cooling successfully provided by means of two rows of nozzles arranged above and below the tile route, with a field of 0.5 m for each nozzle, forming a sprinkling zone 1 m in length. The booth, in stainless steel which may be replaced by plastics in the lower-temperature zones, measuring 3 meters in length comprising a final roller conveyor of 2 meters in length, replaces the final section of the kiln with the air cooling function, which was no less than 30 meters long. The booth intake point, located less than 1 m from the firing chamber exit, receives tiles at a temperature of approximately 1100° C., while their temperature on leaving the booth is about 20° C.

The nozzles are supplied with well water by means of a standby tank of approximately 1 m by means of a pump with delivery rate 31 liters/min and a 2" pipe with recycling. A fan removes 10,000 kg/day of steam from the booth, equivalent to approximately 7 kg/min (at atmospheric pressure), amounting to 28 m /min. Water consumption is, thus only 10 $m^3$/day.

In another application of the method installed on a roller kiln with output 7,448 $m^2$/day of glazed and unglazed tiles, weighing approximately 13 kg/$m^2$, with feed speed 4.2 m/min, the system comprises a water cooling booth equipped with three water pipes arranged above and below the tile route, each equipped with seven spray nozzles, supplied with water at a pressure of 5 bar.

The temperature of the tiles, which is approximately 400° C. when they enter the booth, is reduced to 80° C. over a distance of just one meter: in any case, the speed at which cooling occurs depends on the porosity of the tile bodies, increasing as the porosity decreases. There is a slight vacuum inside the cooling booth, in order to aid extraction of the steam which forms during cooling. The amount of non-recycled water consumed in one hour is approximately 1.6–1.7 $m^3$ with the option of reducing this by up to one half by recycling the cooling water. The cooling cycle is synchronized with the entire production process: the amount of water used is proportional to the temperature variations and the mass for cooling.

The advantages obtained with this invention are: reduction in the area of the cooling zone by up to 95%; the possibility of recycling the steam produced; reduction of the need for monitoring to a much smaller area; cooling in a closed cycle or with minimal emissions to the outside, with the resulting advantages for the environment; the use of a fluid with cooling power approximately 6 times greater than that of air; extremely compact cooling zone; energy saving; saving on plant costs; possibility of using steam generated by the cooling process for cooling higher-temperature areas; automatic regulation of the water cooling process in relation to temperature and mass; energy recycling; the option of using the steam generated by the cooling process in spray-drying plants; greater operating flexibility; possibility of partial applications if required, and the possibility of eliminating the formation of calcium salt deposits on the tile face.

BRIEF DESCRIPTION OF THE DRAWINGS

A number of ways of implementing the invention are illustrated, purely as examples, in the seven drawings enclosed, in which.

DETAILED DESCRIPTION OF THE PREFERRED EMBODIMENTS

Figure 2:
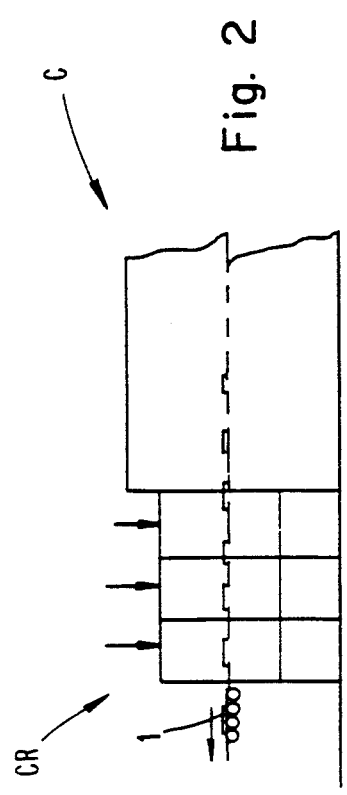
FIG. 2 is a partial, schematic view of the elevation of a general cooling area of the kiln shown in FIG. 1.
Figure 1:
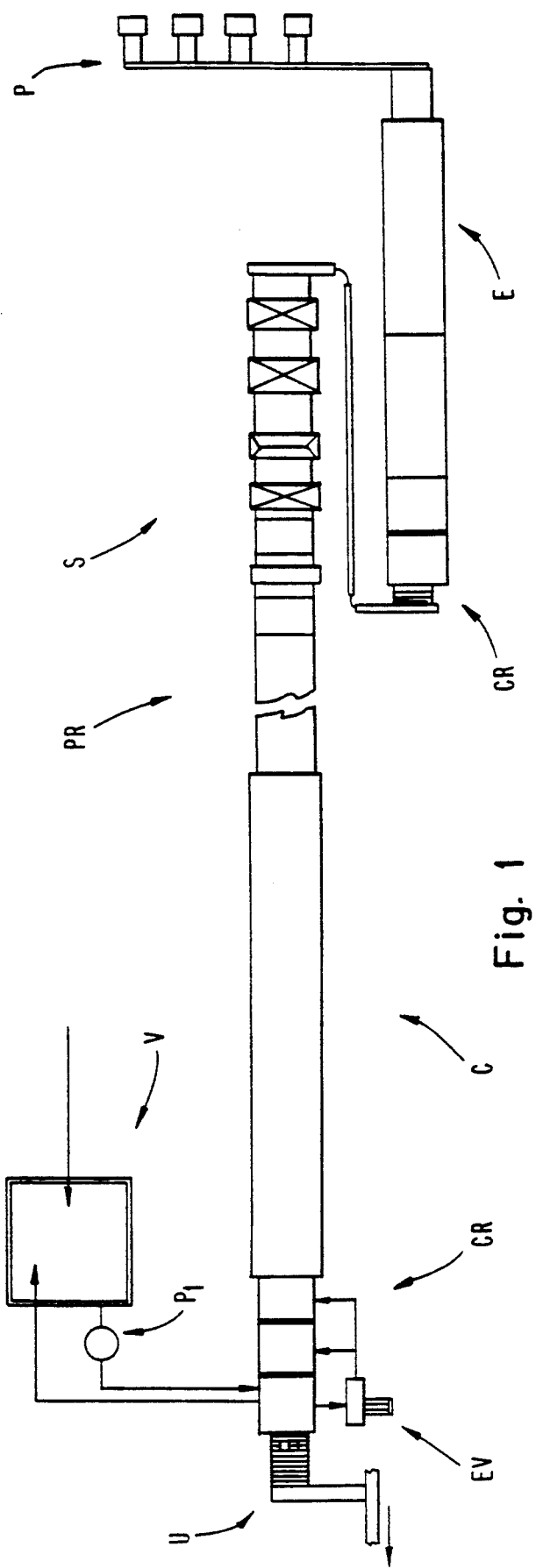
FIG. 1 is a schematic ground-plan of a cooling plant for a plant for the manufacture of ceramic tiles with water-cooled kiln as covered by the invention.
Figure 3:
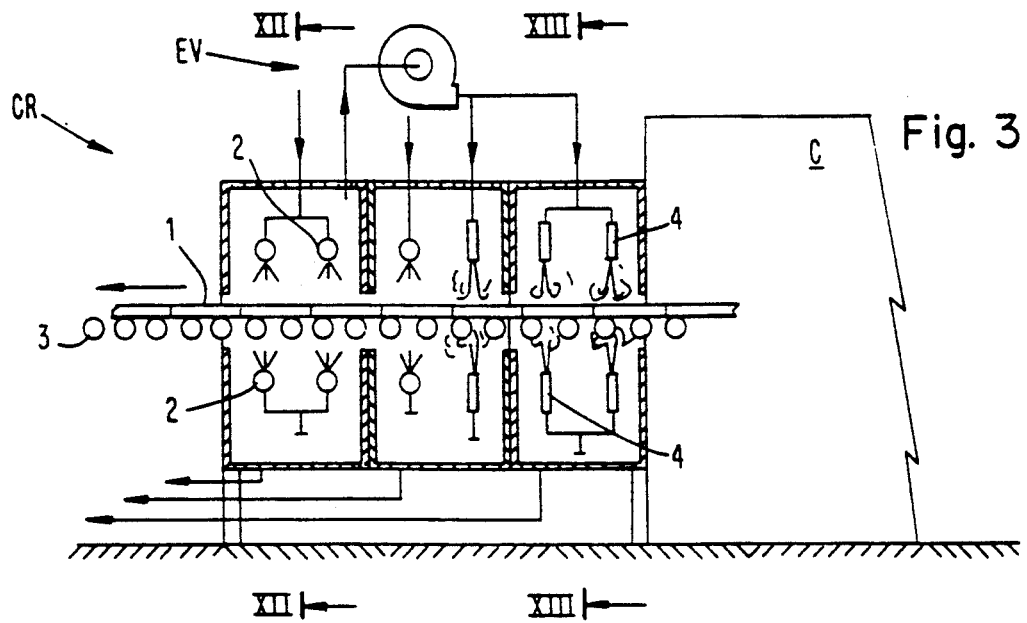
FIG. 3 is an enlarged cross-section of the view shown in FIG. 2, in the case of three cooling stations using steam, water plus steam and water alone in that order.
Figure 4:
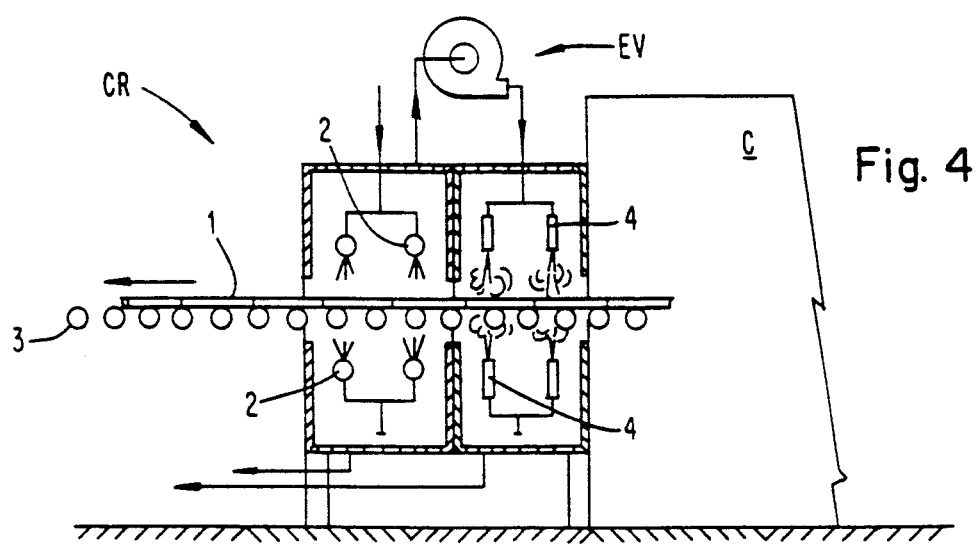
FIG. 4 is a cross-section like that in FIG. 3 in the case of two cooling stations, one using steam and one using water.
Figure 5:
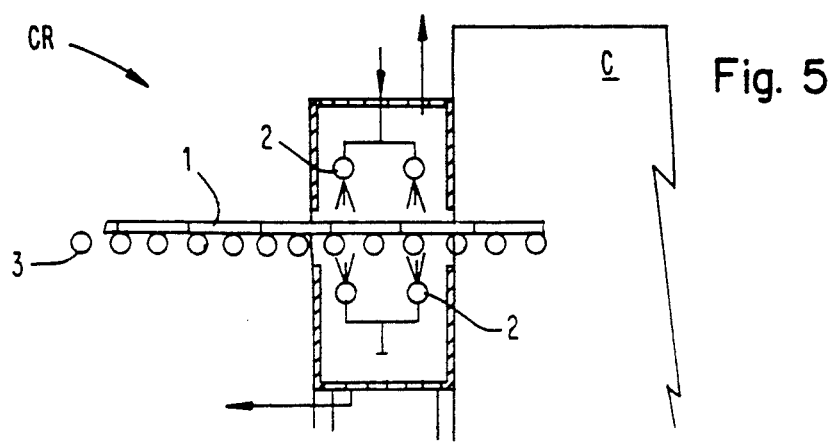
FIG. 5 is a cross-section like that in FIG. 3 but with only one cooling station using water.
Figure 6:
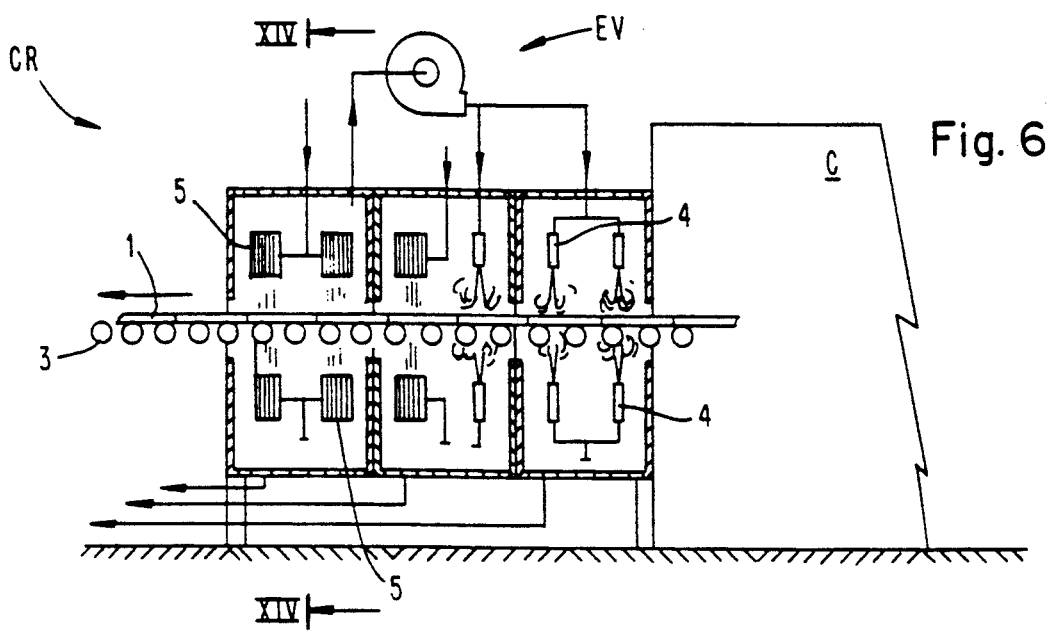
FIGS. 6, 7 and 8 are vertical cross-sections like those shown in FIGS. 3, 4 and 5 with different combinations between the distribution of water and steam.
Figure 7:
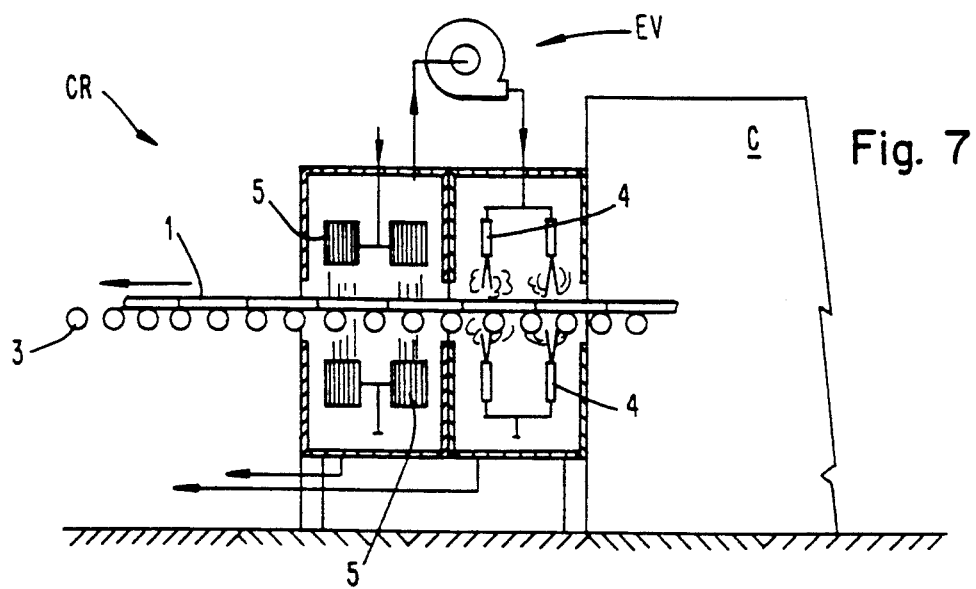
Figure 8:
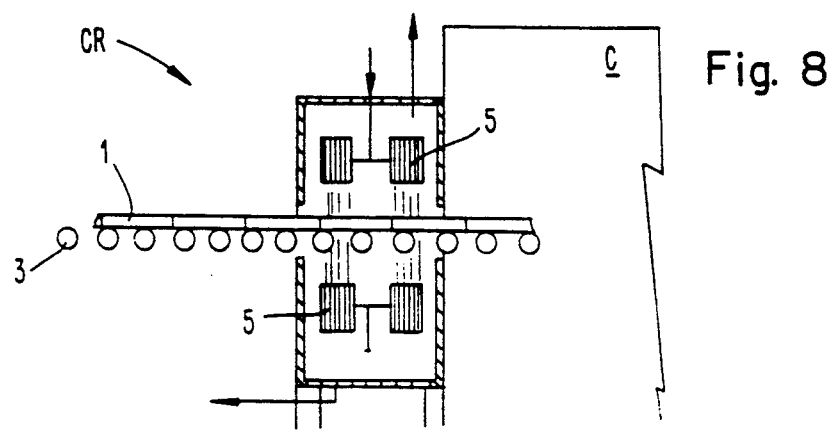
Figure 9:
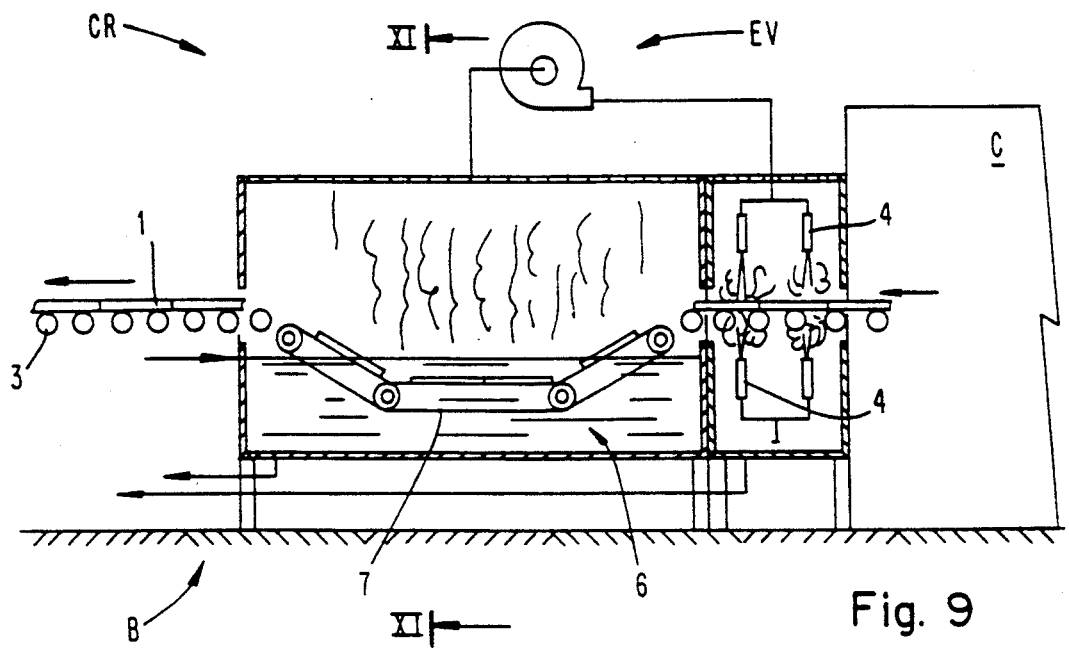
FIG. 9 is the vertical longitudinal cross-section of a two-station booth, the first station using steam-cooling and the second using immersion in water.
Figure 10:
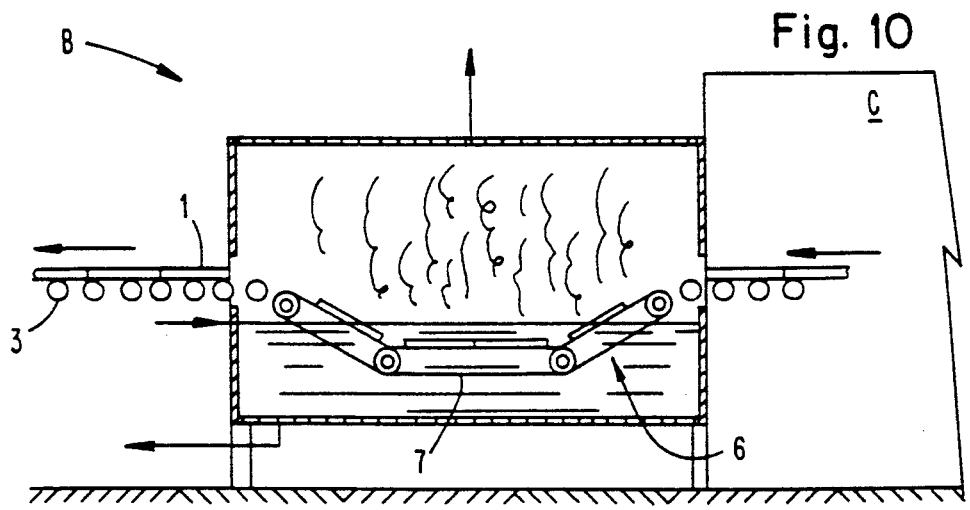
FIG. 10 is a cross-section like that in FIG. 9 but with immersion-cooling only.
Figure 11:
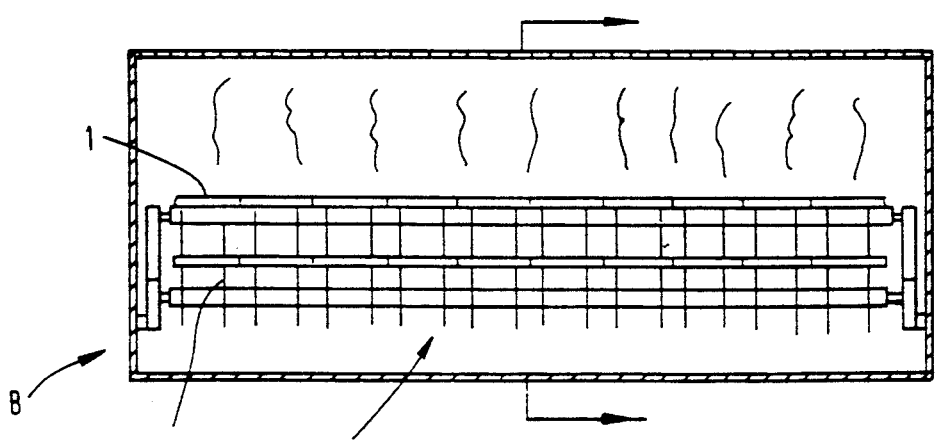
FIG. 11 is the transverse vertical cross-section XI—XI of FIG. 9.
Figure 12:
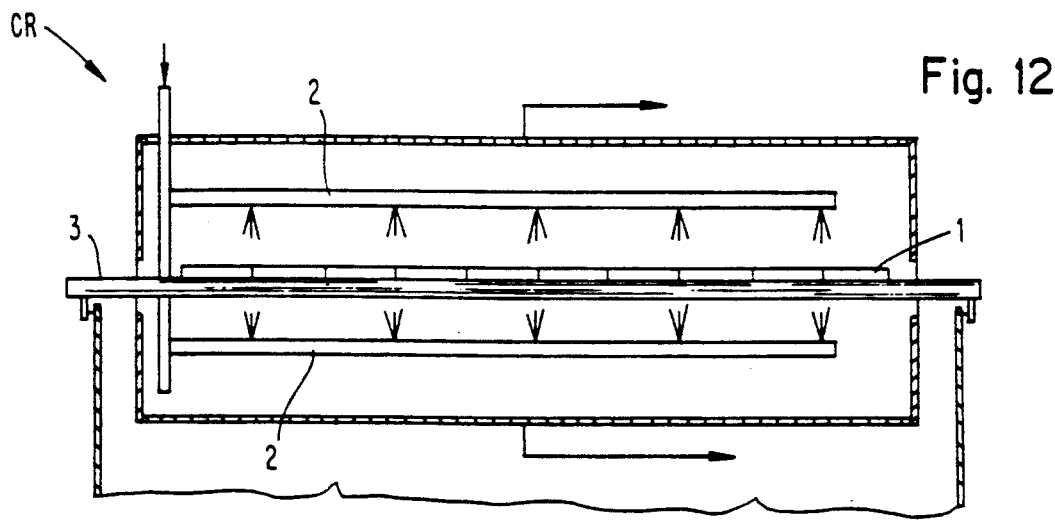
FIG. 12 is the transverse vertical cross-section XII—XII of FIG. 3 (relative to water jets)
Figure 13:
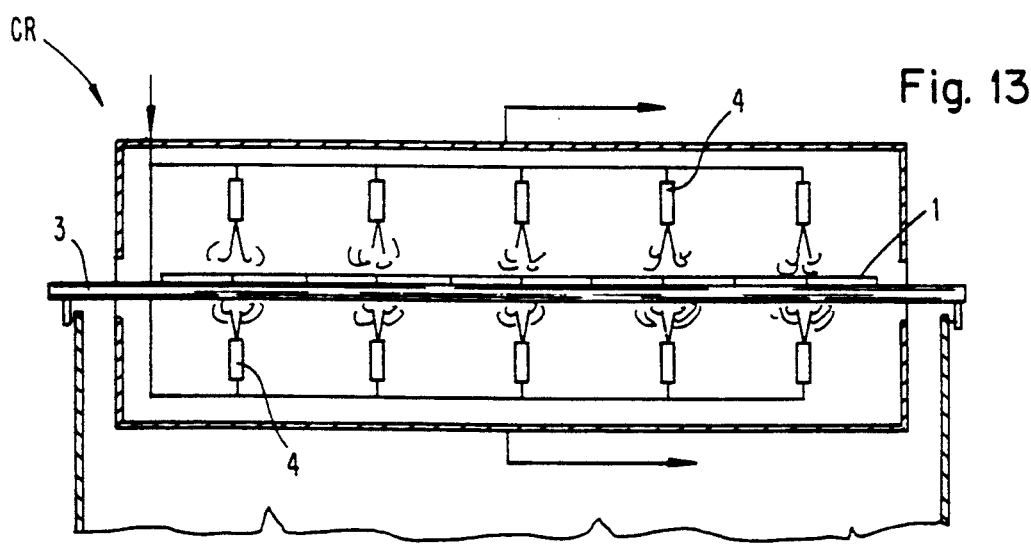
FIG. 13 is the transverse vertical cross-section XIII—XIII of FIG. 3 relative to the steam jets.
Figure 14:
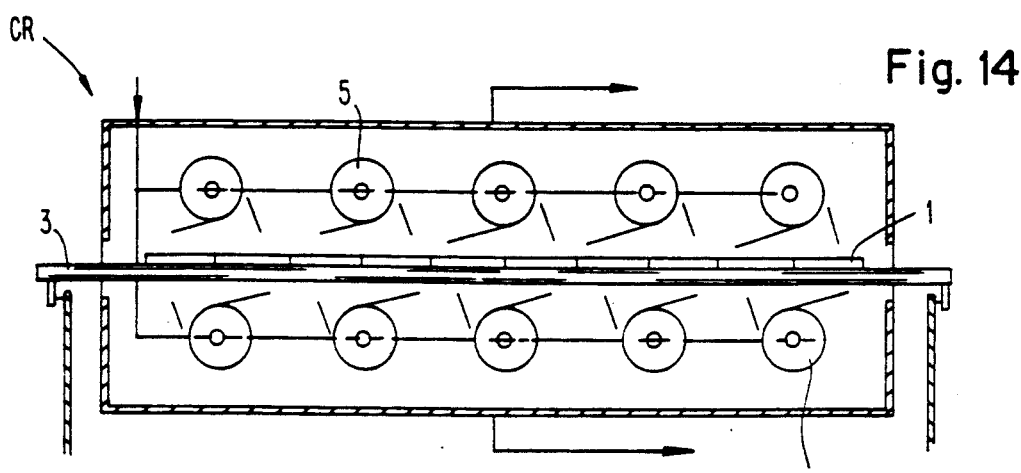
FIG. 14 is the transverse vertical cross-section XIV—XIV of FIG. 6 relative to the spraying of water by means of packs of centrifugal disks.
Figure 15:
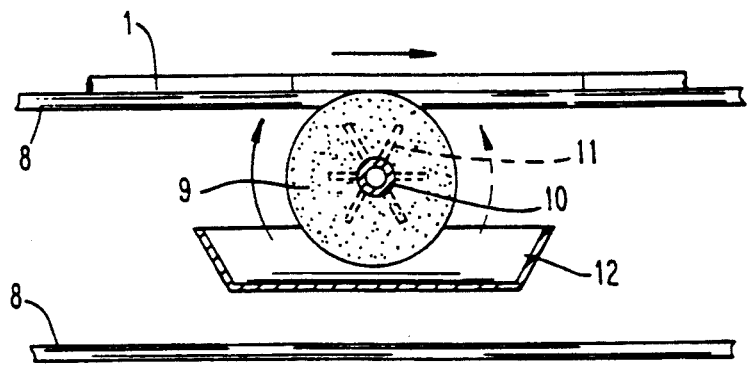
FIG. 15 is a schematic lateral view of a belt-type cooling line constructed in accordance with the invention, with cooling from below only by means of sponge rollers fed internally with water, in the case of water with a high level of hardness or, however, of a type which would leave calcium salt residues on the glazed face of the tile.
Figure 16:
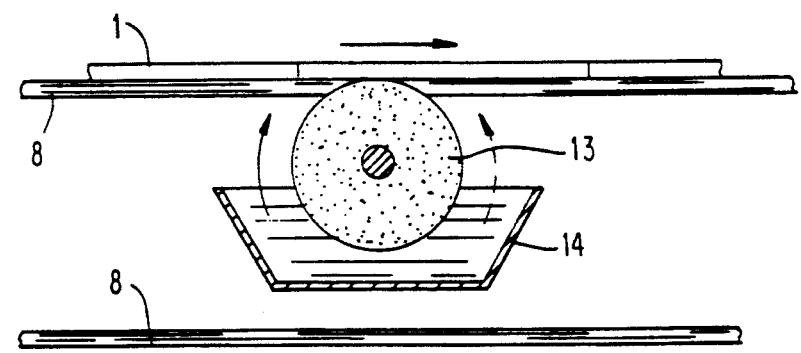
FIG. 16 is a view like that in FIG. 15 with the sponge roller picking up water from a tank.
Figure 17:
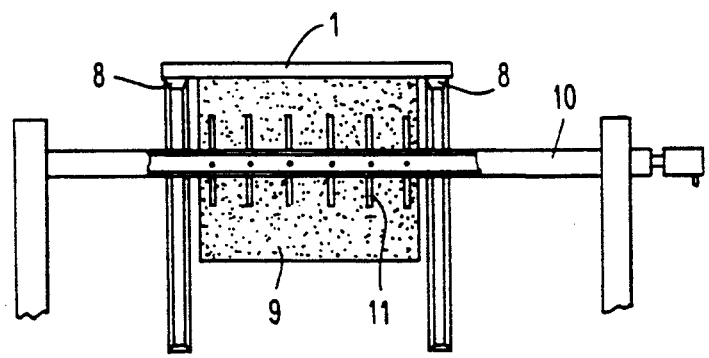
FIGS. 17 and 18 are two transverse cross-sections relating to FIGS. 15 and 16 illustrating the transverse position of the rollers in relation to the, belts.
Figure 18:
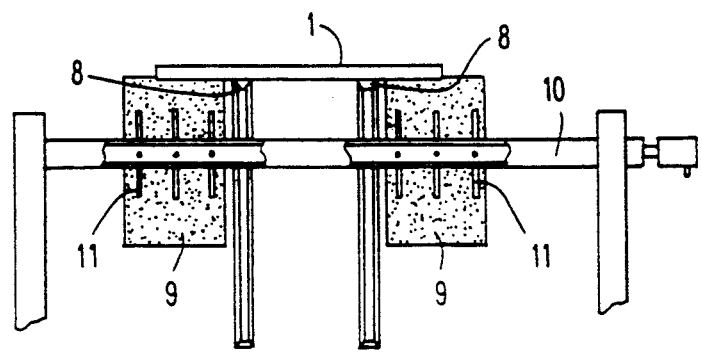
Figure 19:
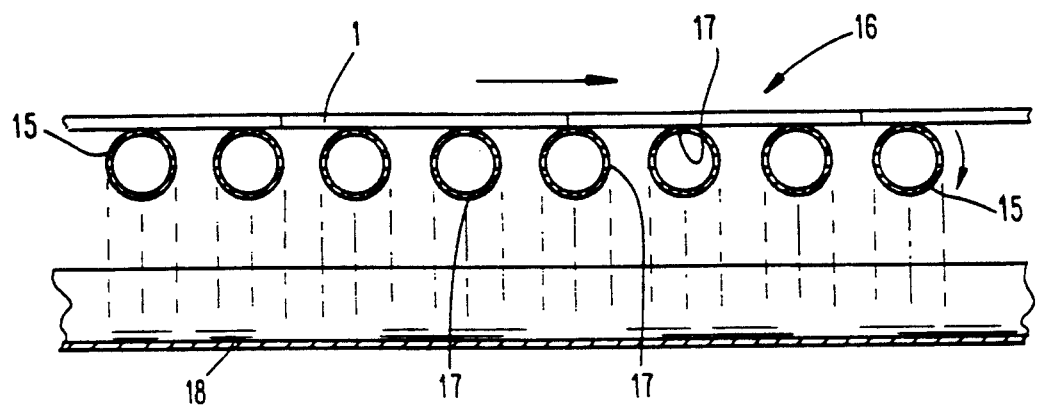
FIG. 19 is a, longitudinal cross-section of the cooling zone as covered by the invention, in the case of roller conveyors, again with cooling carried out from below only.
Figure 20:
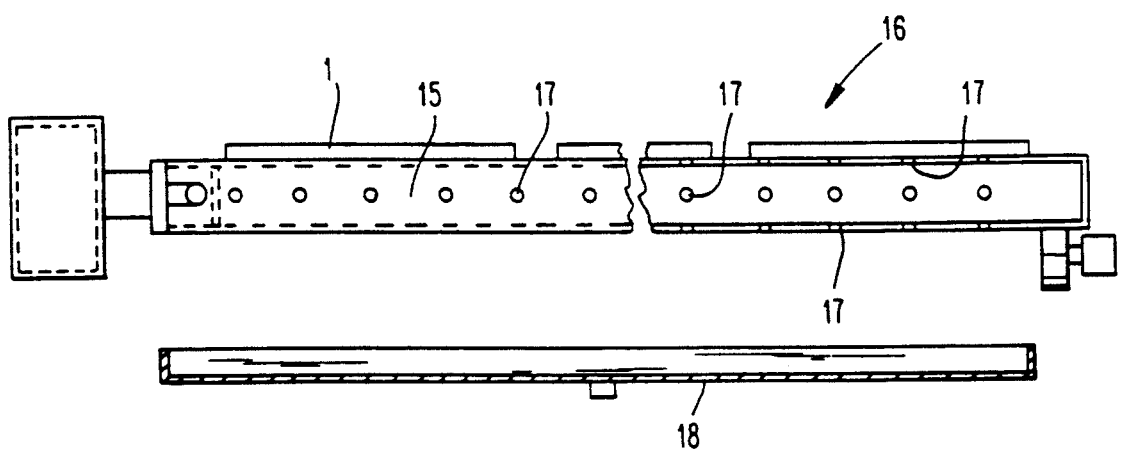
FIG. 20 is a front view of one of the conveyor rollers fed with water in accordance with the invention.

In these drawings: P is the press which forms the tiles; E is the dryer followed by a preliminary heat treatment section at temperatures of up to 1000° C. and over; CR is a cooling booth with one or more station, with spraying of water by means of nozzles or packs of revolving disks, by immersion, by the injection of steam or by a mixture of the above; S is a line for applying glaze to tiles in rows; PR is a preheating area for the roller kiln followed by firing chamber C with temperatures up to 1200° C. and over; U is the offload point of tiles 1 cooled even down to ambient temperature ready for sorting; V is a water tank which, by means of pump P1, supplies the cooling booth; EV is an electric blower which removes the steam generated during the water cooling process to transfer it to the upstream stations involving steam cooling; 2 are the water spray nozzles above and below the tiles 1 conveyed by rollers 3; 4 are steam injector nozzles; 5 are packs of disks revolving at high speed to spray water onto the tiles 1; 6 are lengths of conveyor for tiles 1, for example consisting of ropes 7, conveying the tiles to immerse themselves at station B comprising a water tank and then lift them out of the water; 8 (FIG. 15) are a pair of belts conveying tiles 1 through the water cooling section with temperature less than 150° C.; 9 is a sponge roller which may be of idle or opposite-rotating type, installed transversely beneath the pair of belts 8, whose hollow shaft 10 is equipped with radial distributor pipes 11 that do not reach the surface of the roller to supply the roller itself with water, in order to cool the lower surface of the tiles 1; 12 is a tank for the collection of excess water; 13 (FIG. 16) is a sponge roller not supplied with water but picking up the same from the cooling water tank 14; 15 are the rollers conveying the line of tiles 16, said rollers being hollowed out and equipped with radial holes 17, supplied with slightly pressurized water for sprinkling on the underside of tiles 1 making up the line, and 18 is a tank for the collection of excess water.

The system functions as follows. The tiles 1, which have just left the firing chamber C, undergo cooling, for example and preferably by means of recycled steam, before passing on to water-cooling by means of nozzles, packs of disks and/or immersion, until they are cooled even to ambient temperature; local intensity of the cooling process varies in relation to the product type and firing cycle.

In practical applications, the materials, dimensions and construction details may be different from those indicated, but technically equivalent to the same, without ceasing to be covered by the legal jurisdiction of this invention.

Thus the shape of the booth, the arrangement within the same of the water and/or stream spray or sprinkling elements and the coolant distribution may vary in relation to the special features of the heat cycle of the ceramic material.

I claim:

1. A method for cooling hot articles made of a ceramic material, as the hot articles are moved from a kiln while supported on a plurality of rollers, comprising the steps of:

applying jets of steam to the hot moving articles from above and below in an initial cooling stage;

applying jets of steam followed by jets of water, from above and below, to the initially-cooled moving articles in an intermediate cooling stage; and applying jets of water from above and below to the moving articles in a final cooling stage, to cool them to close to ambient temperature.

2. A method of cooling hot articles according to claim 1, wherein:

the jets of steam in the initial and intermediate cooling stage are at least in partly fed by steam generated by contact between the jets of water and said hot articles in the intermediate and final cooling stages.

3. A method for cooling hot articles made of a ceramic material, as the hot articles are moved from a kiln while supported on a plurality of rollers, comprising the steps of:

applying jets of steam, from above and below, to the hot moving articles in an initial cooling stage;

applying jets of water from above and below to the initially cooled moving articles, in a final cooling stage, to cool them to close to ambient temperature, wherein the jets of steam in the initial cooling stage are at least partly fed by steam generated by the contact between the jets of water and said hot articles in the final cooling stage.

* * * * *